UNITED STATES PATENT OFFICE.

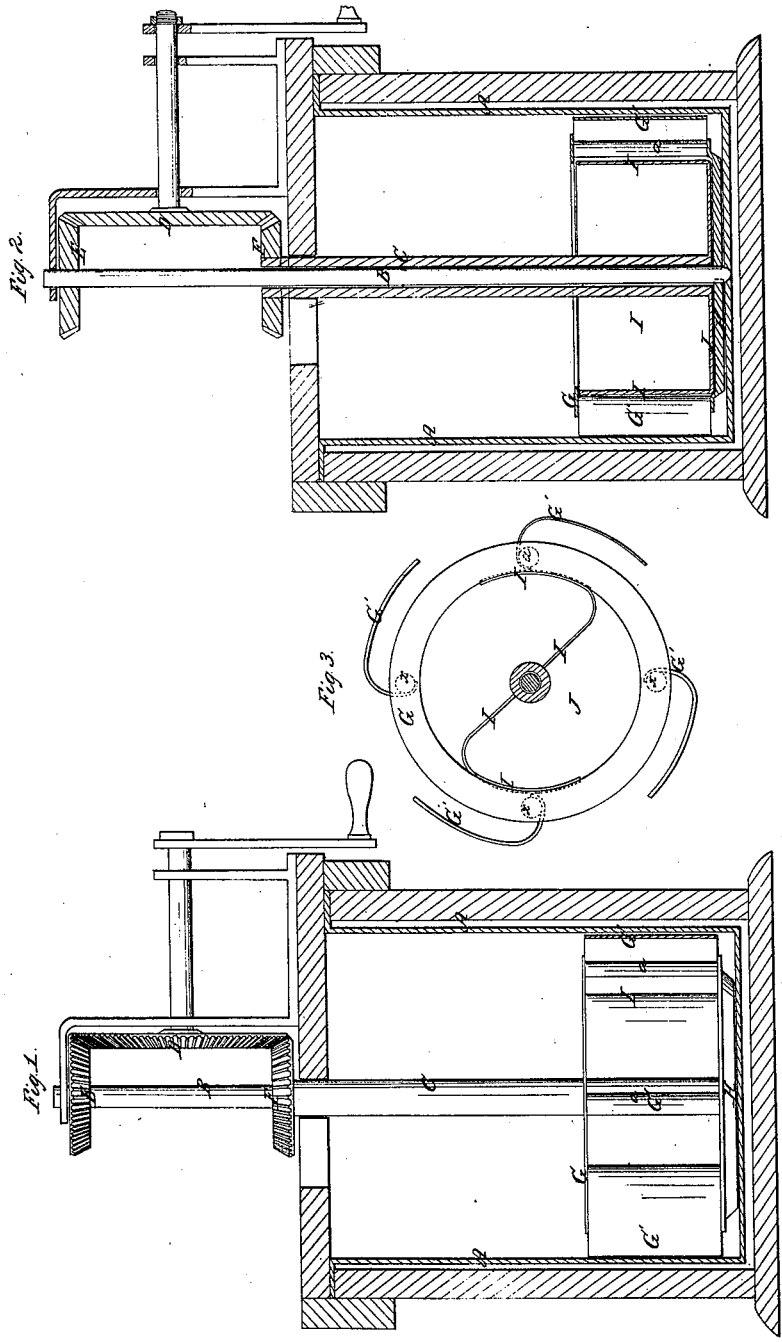

J. MACNISH, OF BERLIN, WISCONSIN.

CHURN.

Specification of Letters Patent No. 20,804, dated July 6, 1858.

*To all whom it may concern:*

Be it known that I, JAMES MACNISH, of Berlin, in the county of Marquette and State of Wisconsin, have invented a new and useful Improvement in Churns for Making Butter by Friction; and I do hereby declare that the following is a full, clear, and exact description of the same, reference being had to the accompanying drawings, forming a part of this specification, in which—

Figure 1, is a view of a churn constructed with my improvements, the tub only being shown in section. Fig. 2, is a vertical central section of the same, all the parts being shown in section. Fig. 3, is a horizontal section of the dasher.

Similar letters of reference, in each of the several figures, indicate corresponding parts.

The nature of my invention consists in arranging on two dashers, which revolve in opposite directions, tangentially set spring wings; the wings of the inner shaft bearing with a yielding friction against the inner circumference of the churn tub, and those of the outer shaft with a yielding friction within the circle and against a surface presented by the wings of the inner shaft.

My invention also consists, in combination with the above, in providing the outer and inner set of wings with a circular friction plate at their base, the plate of the outer set of wings revolving in close contact with the bottom of the churn, and the plate of the inner circle revolving in close contact with the upper surface of the plate of the outer set. By the above arrangement of wings and plates, the cream or milk is subjected to a thorough expressing and friction action, and the globules or sacks which contain the fatty particles of butter are effectually broken, or butter produced very speedily.

To enable others, skilled in the art, to make and use my invention, I will proceed to describe its construction and operation.

A, represents a cylindrical churn tub of ordinary construction.

B, C, are two dasher shafts, one solid and the other tubular. The tubular shaft surrounds the solid one as usual and revolves in an opposite direction to the same.

D, E, F, are bevel wheels for revolving these shafts in opposite directions.

Thus far the churn described is similar to those in common use.

G, is a skeleton or open cylinder secured fast to the solid or inner shaft B. The cylinder has a series of spring wings or blades G′, G′, G′, G′, set tangentially around its circumference as shown in Fig. 3. Said wings are arranged and shaped so as to bear with a broad curved surface against the inner circumference of the churn tub A, as shown in Figs. 2 and 3. The top of the skeleton cylinder is open while the bottom is closed by a circular friction plate H, of smaller diameter than the churn tub, said plate being attached fast to the lower end of the inner shaft and arranged to work in close contact with the bottom of the churn. The wings serve for causing friction and expressing the cream or milk between themselves and the inner circumference of the churn tub, while the bottom plate H, serves for causing friction and expressing the cream or milk between itself and the bottom of the churn tub. The cream is also kept in rapid motion by the revolution of the wings and plate.

To render the churning more effectual I arrange a series of tangential wings I, I, and a bottom plate J, within the chamber of the skeleton cylinder, said wings and plate being secured fast to the tubular shaft C, and the former arranged to come with a broad curved surface in contact with the surface presented by the standards *a*, *a*, to which the wings are attached, and the latter to work in close contact with the top surface of the bottom plate of the skeleton cylinder, as shown in the drawing. The office to be performed by these wings and the plate is the same as that performed by the wings and plate of the skeleton cylinder, the cream or milk being subjected to friction and expressed between the inner and outer wings and between the upper and lower plates.

What I claim as my invention, and desire to secure by Letters Patent, is—

1. The combination of the inner set of tangentially set spring wings I, I, with the outer set of wings G′, G′, G′, G′, substantially as and for the purposes set forth.

2. The combination of the friction plates H, J, with the two sets of spring wings and the churn tub, substantially as and for the purposes set forth.

JAMES MACNISH.

Witnesses:
G. YORKE AT LEE,
B. A. BEARDSLEY.